United States Patent [19]

Saita

[11] Patent Number: 4,751,537
[45] Date of Patent: Jun. 14, 1988

[54] PHOTOGRAPHING NUMBER CHANGE-OVER DEVICE FOR FOUR LENS CAMERA

[75] Inventor: Kazuo Saita, Omiya, Japan

[73] Assignee: Mamiya Camera Co., Ltd., Tokyo, Japan

[21] Appl. No.: 81,099

[22] Filed: Aug. 3, 1987

[51] Int. Cl.⁴ .............................................. G03B 41/00
[52] U.S. Cl. ...................................... 354/118; 354/125
[58] Field of Search ......................... 354/118, 120, 125

[56] References Cited

U.S. PATENT DOCUMENTS 3,443,499  5/1969  Sianino .............................. 354/118 X Primary Examiner—Michael L. Gellner
Attorney, Agent, or Firm—Pollock, VandeSande & Priddy

[57] ABSTRACT

A photographing number change-over device is effectively used for a four lens camera capable of simultaneously photographing four pictures on a film. The device comprises a first sector for shutting off two photographing lenses symmetrically opposed with respect to a center axis of the film, a second for shutting off either one of two remaining photographing lenses, and a driving member rotatively driven in increments of 90° by a motor through a reduction gear, a cam, a reciprocal moving member, a bell crank lever and an engaging pawl for driving the first and second sectors to positions where all the photographing lenses are not shut off. The device further comprises regulating pins which are engageable and stopping the first and second sectors at positions where the photographing lenses are shut off, and an annular change-over member for changing over the regulating pins to a first position where the regulating pins engage and stop both the first and second sectors, a second position where the regulating pins engage and stop only the first sector, and a third position where the regulating pins engage and stop neither the first sector nor the second sector. With this arrangement, required picture number photographing is always effected even if the photographing number is changed under any conditions.

11 Claims, 17 Drawing Sheets

FIG_1
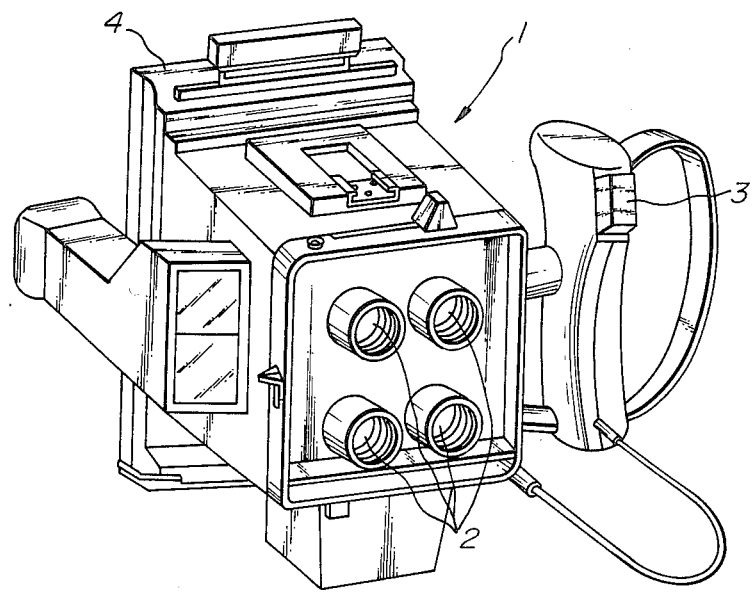
FIG_2
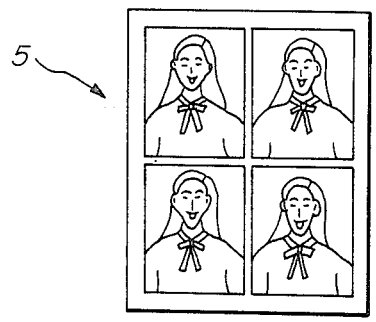

FIG_4

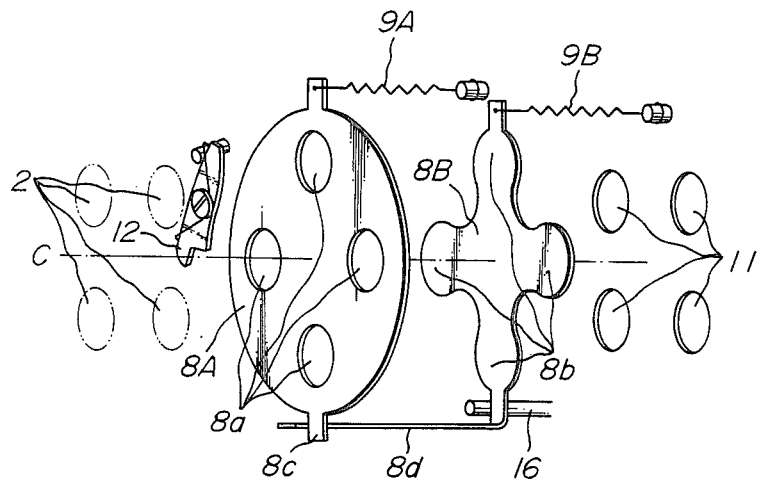
FIG_6
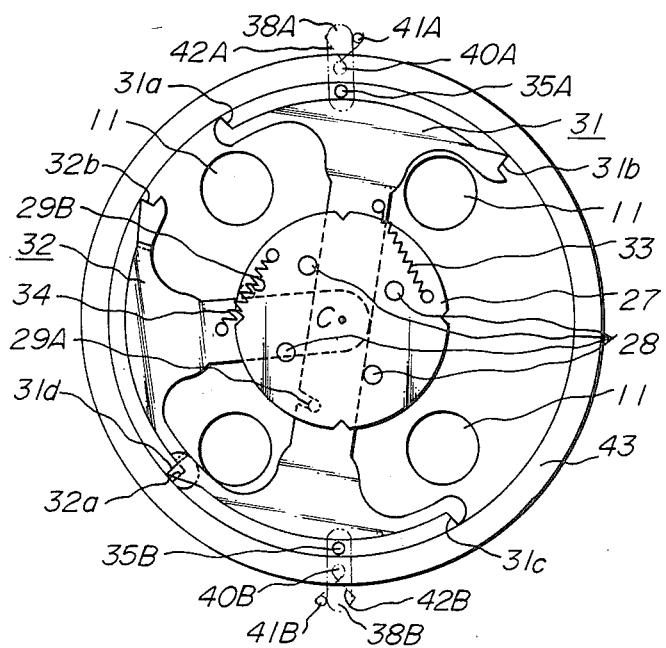
FIG_7

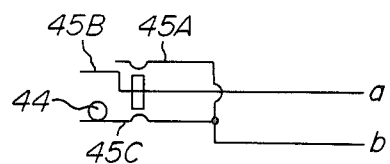
FIG_9a
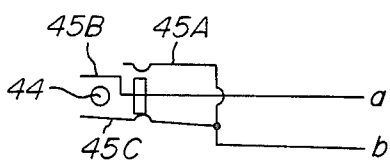
FIG_9b
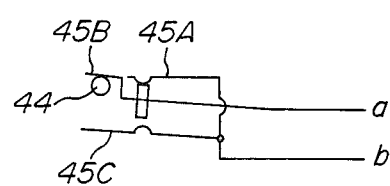
FIG_9c

FIG_10a
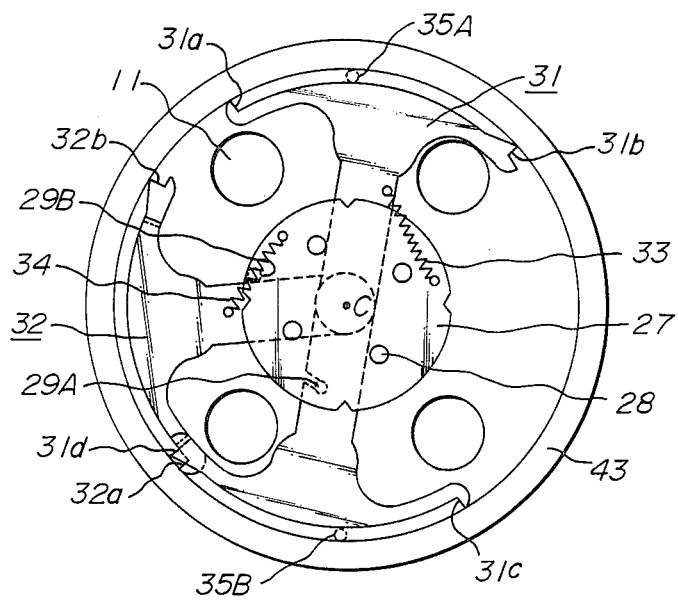
FIG_10b
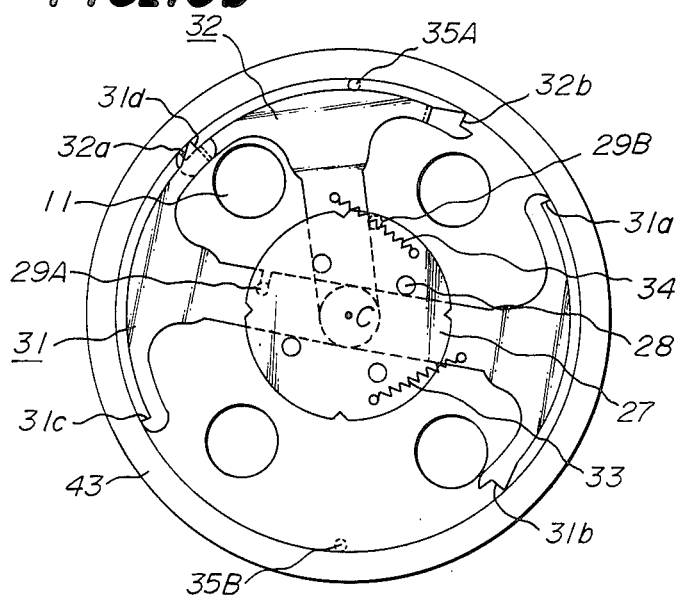

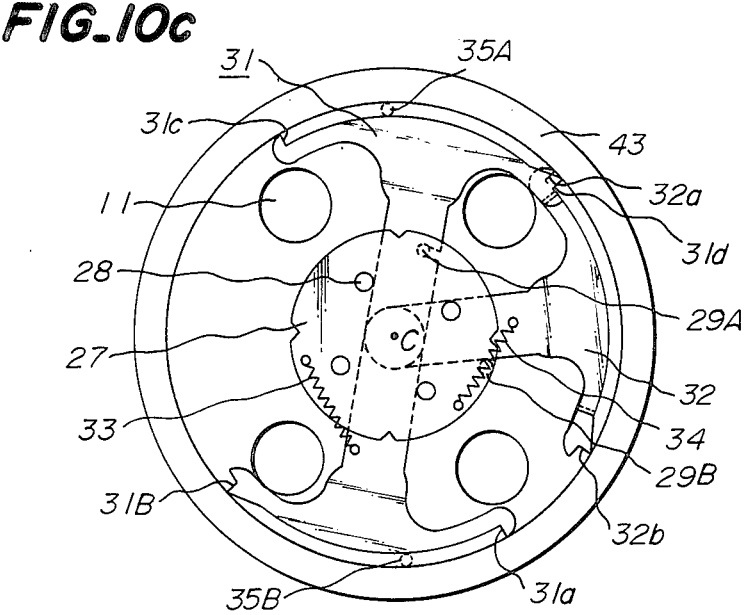
FIG_10c
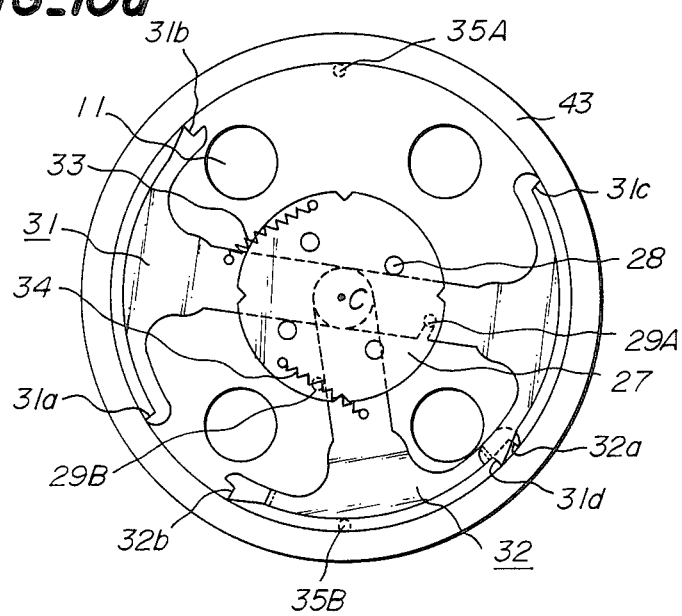
FIG_10d

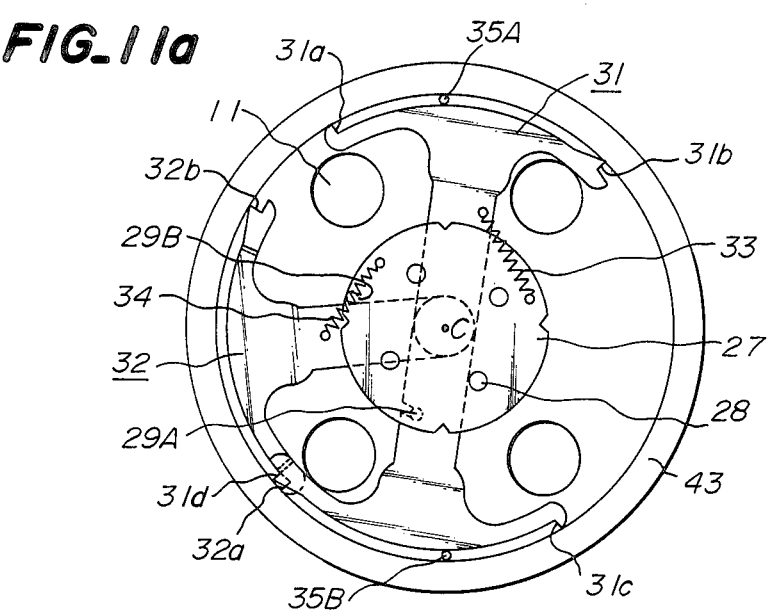
FIG_11a
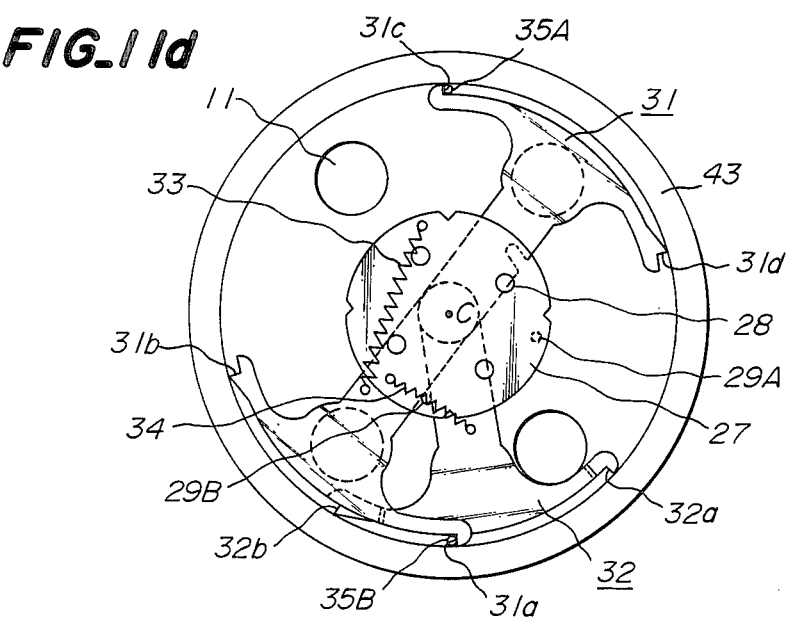
FIG_11d

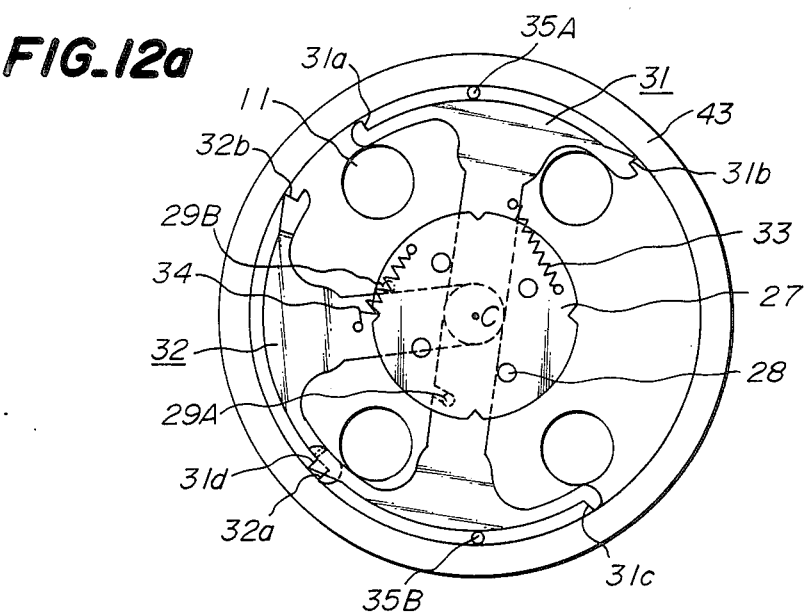
FIG._12a
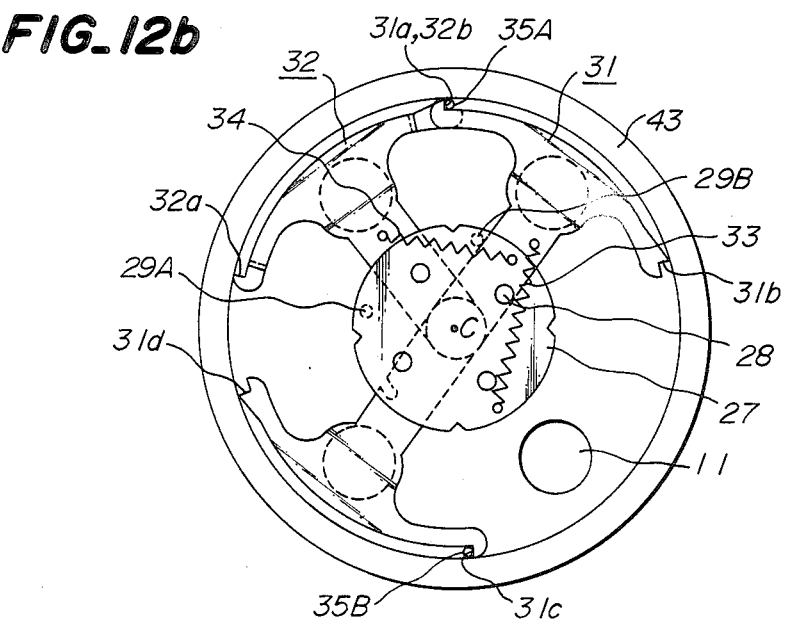
FIG._12b

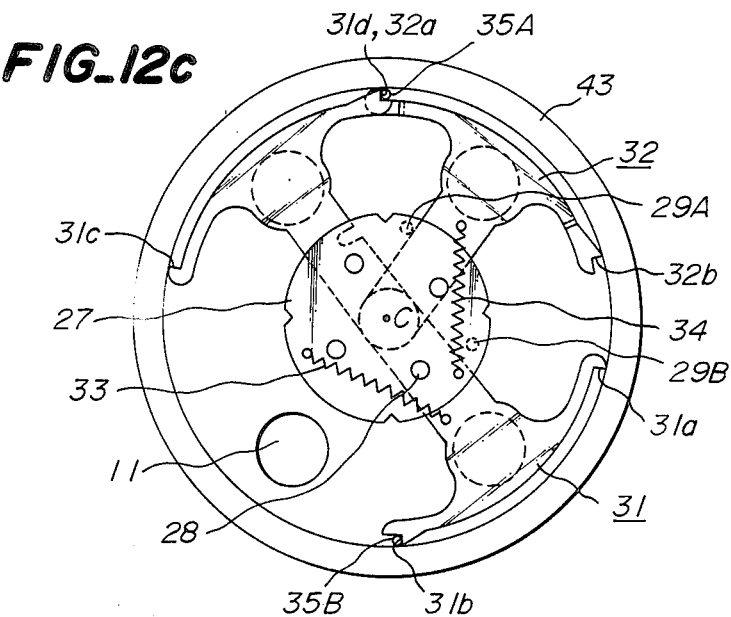
FIG_12c
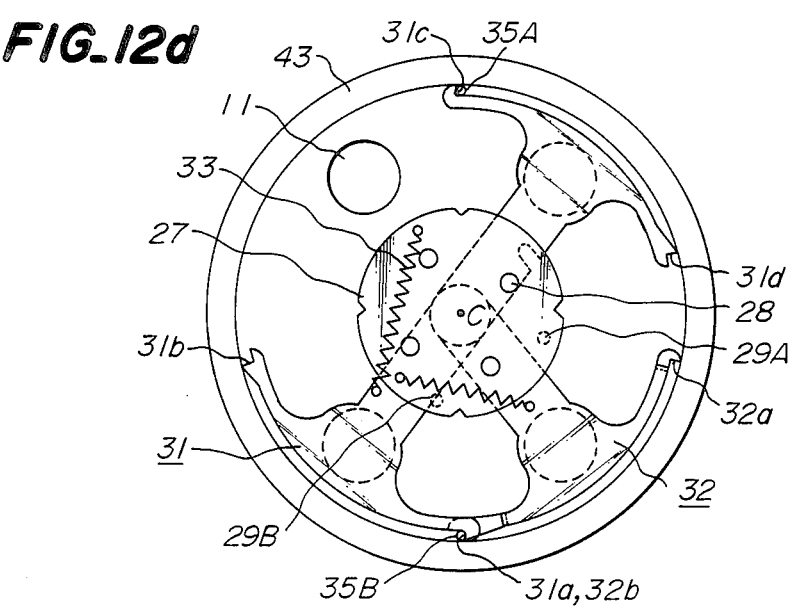
FIG_12d

FIG_12e
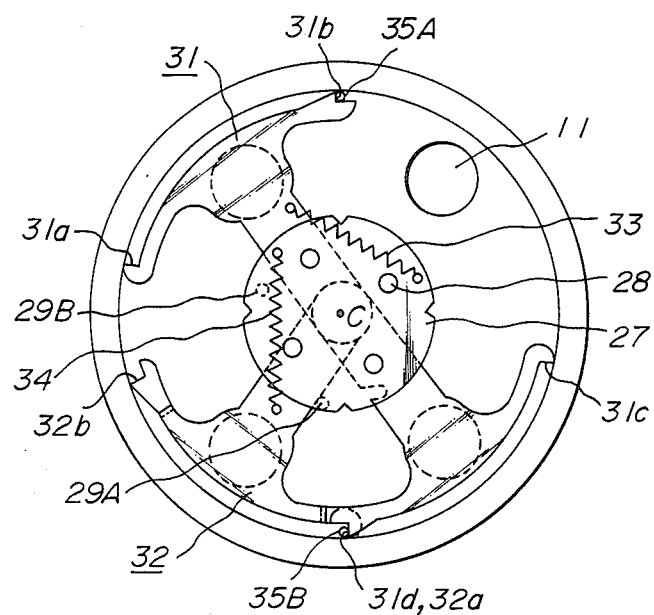

PHOTOGRAPHING NUMBER CHANGE-OVER DEVICE FOR FOUR LENS CAMERA

BACKGROUND OF THE INVENTION

This invention relates to a photographing number change-over device for a four lens camera having four photographing lenses with shutters and capable of simultaneously photographing four pictures on a film.

There has been a camera which is able to photograph four portraits simultaneously required for various licenses, certificates and the like, as shown in FIG. 1.

In briefly explaining, a camera body 1 includes crossed partition walls therein which divided its inner space into four equal chambers provided with photographing lenses 2 and shutters (not shown). When a release button 3 is operated, the four sets of the shutters are simultaneously opened and closed to photograph four identical pictures on an instant film 5 accommodated in a film holder 4 as shown in FIG. 2.

With such a hitherto used four lens camera, four pictures are simultaneously photographed by one photographing operation as above described. If it is desired to photograph four pictures different in expression or background one by one, it is usual to photograph four similar pictures on a film four times notwithstanding superfluity.

In order to avoid the superfluous films, it is considered to photograph only by one photographing lens with three remaining photographing lenses being covered by lens cap. In this case, the photographing is effected four times with one uncovered lens changed one by one. However, this procedure is considerably complicated and there is a tendency for the lens to be mistakenly uncapped resulting in multiple exposure. Therefore, this method involves various problems in practical use.

Moreover, there have been photographing number change-over devices for four lens cameras, for example, disclosed in Japanese Laid-open Patent Application Nos. 62-23,028 and 62-23,029 Laid-opened on Jan. 31, 1987.

The four lens camera of the former Japanese Applications is provided with conversion lenses for changing magnifications of images, while the camera of the latter is not provided with any conversion lenses. However, the photographing number change-over devices of the former and latter are quite the same in construction.

Each of the change-over devices disclosed in the above Laid-open applications includes shutters for simultaneously exposing frames of a film and shut-off devices provided in front of the film for selectively exposing at least one of the frames of the film. The shut-off device includes two screen shutters arranged one above the other and extending in tension between winding-up and winding-off drums. The screen shutters are formed with one opening, respectively, aligned with each other in a vertical direction and the other openings spaced apart from the one opening by different distances. An externally operable change-over dial is provided for driving the screen shutters. When the change-over dial is rotated in one direction, one screen shutter follows behind the other screen shutter by one section. When the dial is rotated in the reverse direction, the other screen shutter follows behind the one screen shutter. In photographing, the change-over dial is manually rotated one, two and four times for photographing four, two and one pictures.

The disclosed change-over device further includes four shut-off blades arranged two above the two other blades in front of the respective sections of the film and urged in shut-off directions, two sets of first opening means one above the other set and actuated by a change-over member to hold the shut-off blades so as to open four sections of the film, second opening means controlled by a cam member adapted to be displaced by the above change-over member and a disc rotated through 90° every photographing to make operative one set of the first opening means and inoperative the other set of the means so as to alternately open two upper or lower sections and four sets of third opening means driven by the above cam member to make operative any one of the shut-off blades and inoperative the three remaining shut-off blades.

However, these change-over devices have the following disadvantages, respectively. The former change-over device needs mechanisms corresponding to two sets of focal-plane shutters one set above the other in addition to normal shutter mechanisms, so that the construction is complicated to make the camera bulky. Moreover, when photographing two or one picture, the change-over dial must be operated, so that the operations are complicated. Such complicated operations tend to be missed resulting in multiple exposure and unexposed frames of a film.

Moreover, the latter change-over device requires to have the four shut-off blades provided at every section, the first opening means for holding all the shut-off blades inoperative, the second opening means for holding the two shut-off blades operative and the remaining blades inoperative, and the third opening means for holding the one shut-off blade operative and the remaining blades inoperative. Therefore, the construction is very complicated to make it difficult to incorporate the device in a camera.

SUMMARY OF THE INVENTION

It is a principal object of the invention to provide an improved photographing number change-over device for a four lens camera, which eliminates all the disadvantages of the prior art.

In order to achieve this object, a photographing number change-over device for a four lens camera having four photographing lenses and capable of simultaneously photographing four pictures on a film according to the invention comprises first light shutting-off means for shutting off two photographing lenses symmetrically opposed with respect to a center axis substantially perpendicular to the film and passing through a substantial center of the film, second light shutting-off means for shutting off either one of two remaining photographing lenses, driving means rotatable about said center axis in increments of 90° for driving through resilient means said first and second light shutting-off means to positions where all the photographing lenses are not shut off, regulating means engageable and stopping said first and second light shutting-off means against forces of said resilient means at positions where the photographing lenses are shut off, and change-over means for changing over said regulating means to a first position where engaging and stopping both said first and second light shutting-off means, a second position where engaging and stopping only said first light shutting-off means, and a third position where engaging and stopping neither the first nor the second light shutting-off means.

With this arrangement, when the change-over member is set to bring the regulating members into the first position, the first and second sectors rotating following to the driving member are stopped by the regulating members against driving force of the driving member. In this condition, the three photographing lenses are shut off and the one remaining photographing lens is opened so that only one picture is photographed on one quarter of a frame of a film by single photographing.

After finishing of the one photographing, the regulating members are temporarily moved geared therewith away from the passage of the sectors and again returned thereinto. By a next shutter charge, the first and second sectors keep the next photographing lens open and shut off the other remaining photographing lenses so that the next picture is photographed on a quarter area adjacent to the previously photographed quarter area of the film. By repeating this photographing, four different pictures are photographed in succession.

Moreover, when the change-over member is set to bring the regulating members into the second position, only the first sector is engaged with and stopped by the regulating members followed by the rotation of the driving member so that the two photographing lenses in symmetrical position with respect to the center axis of the film are shut off. Accordingly, two pictures substantially the same are photographed by the two remaining photographing lenses. By the next shutter charge, only the first sector is again engaged with and stopped by the regulating members so that the two photographing lenses which have carried out the previous photographing are shut off and the two remaining pictures are photographed by the two remaining photographing lenses.

Furthermore, when the change-over member is set to bring the regulating members into the third position, the four photographing lenses are always maintained opened because the first and second sectors are not engaged with and stopped by the regulating members upon rotation of the driving member. Therefore, four identical pictures are simultaneously photographed on the film.

In other words, what is required every photographing is to rotate the driving member in increments of 90° and to rotate the first and second sectors in response to the rotation of the driving member, thereby enabling the required lenses to be opened. In this manner, the manual change-over operation every photographing is not needed, and any multiple exposure and unexposed frames of a film are completely eliminated.

Moreover, the respective photographing lenses are shut off by the two sectors rotating in the same direction so that the construction of the device is simplified and can be easily incorporated in a narrow space in a camera.

It is of course understood that the operation of bringing a shutter into a condition ready for photographing is referred to herein as "shutter charge" or "shutter is charged".

In order that the invention may be more clearly understood, preferred embodiments will be described, by way of example, with reference to the accompanying drawings.

BRIEF DESCRIPTION OF THE DRAWINGS

FIG. 1 is a perspective view illustrating as one example a four lens camera of the prior art;

FIG. 2 is a plan view illustrating a film on which four pictures are photographed on the four lens camera shown in FIG. 1;

FIG. 6 is an exploded perspective view illustrating a shutter mechanism of the principal part on a front side;

FIG. 7 is a backside view illustrating a driving member and first and second sectors of the first embodiment;

FIGS. 9a, 9b and 9c illustrate different changed over conditions of change-over contacts for the change-over mechanism;

FIGS. 10a, 10b, 10c and 10d illustrate different rotated conditions of the device when the camera is set at four picture photographing;

FIGS. 11a, 11b, 11c and 11d illustrate different rotated conditions of the device when the camera is set at two picture photographing;

FIGS. 12a, 12b, 12c, 12d and 12e illustrate different rotated conditions of the device when the camera is set at one picture photographing;

DESCRIPTION OF THE PREFERRED EMBODIMENT

Figure 3:
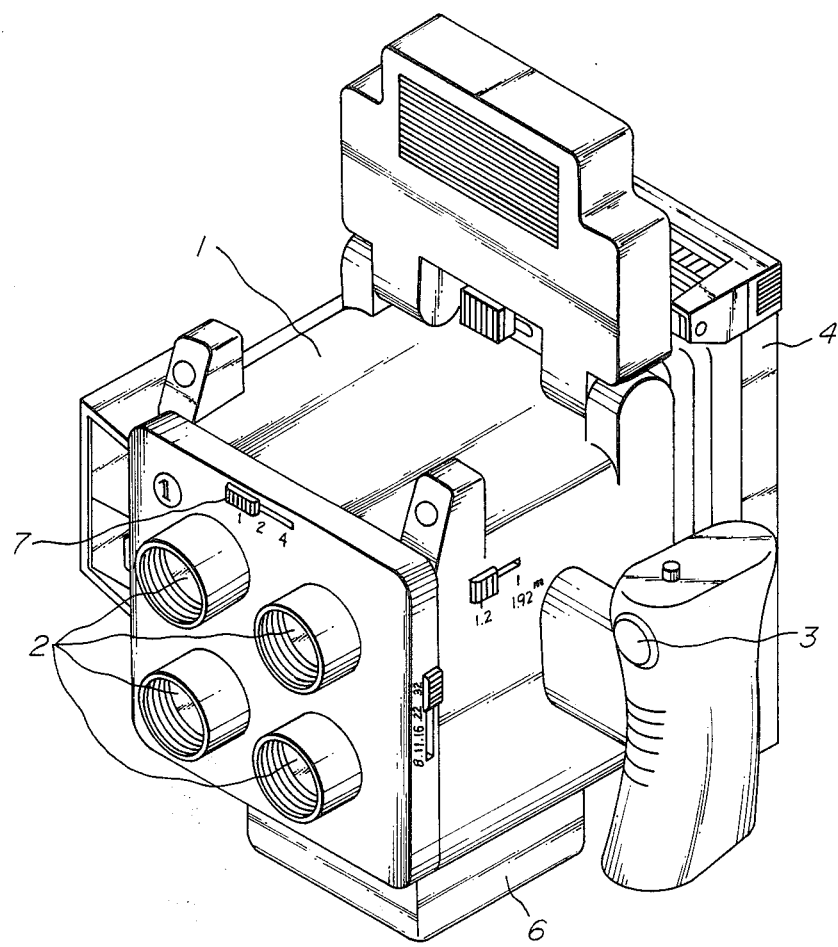
FIG. 3 is a perspective view illustrating an outline of a four lens camera to which the invention is applied.

FIG. 3 illustrates the outline of a four lens camera equipped with a photographing number change-over device according to the invention, wherein like components are designated by the same reference numerals as those in FIG. 1.

The four lens camera comprises at its lower portion a motor-driven charge device 6 having a motor therein. An electromagnetic release unit (not shown) built in a camera body 1 is actuated by pressing a release button 3 to open and close a shutter and thereafter the shutter is charged by an operation of the motor-driven charge device 6 to bring the camera into a condition ready for next photographing. Reference numeral 7 denotes a change-over knob for changing the number of photographing to one, two or four.

Figure 4:
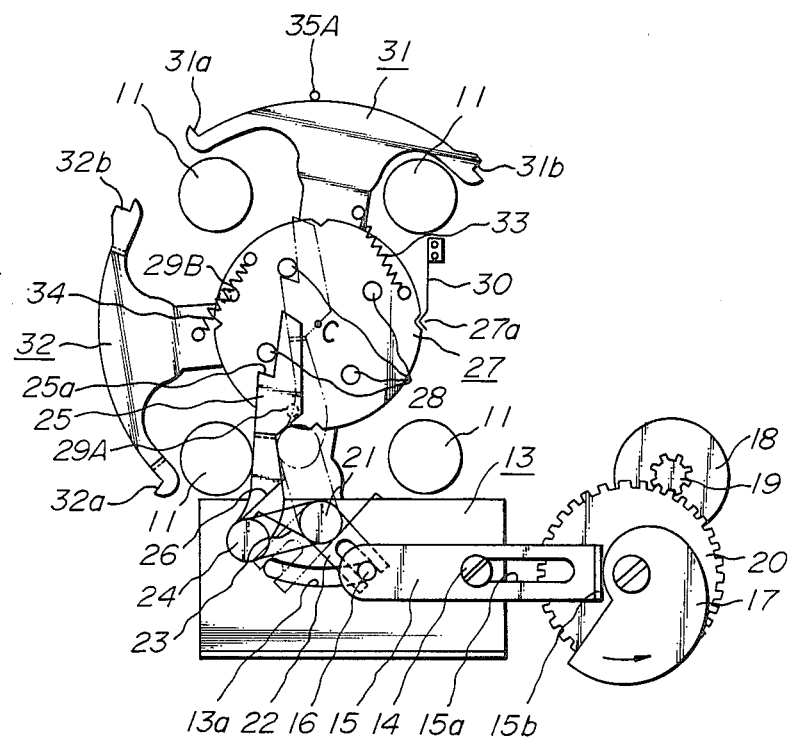
FIG. 4 is a backside view illustrating a principal part of a first embodiment of the invention.
Figure 5:
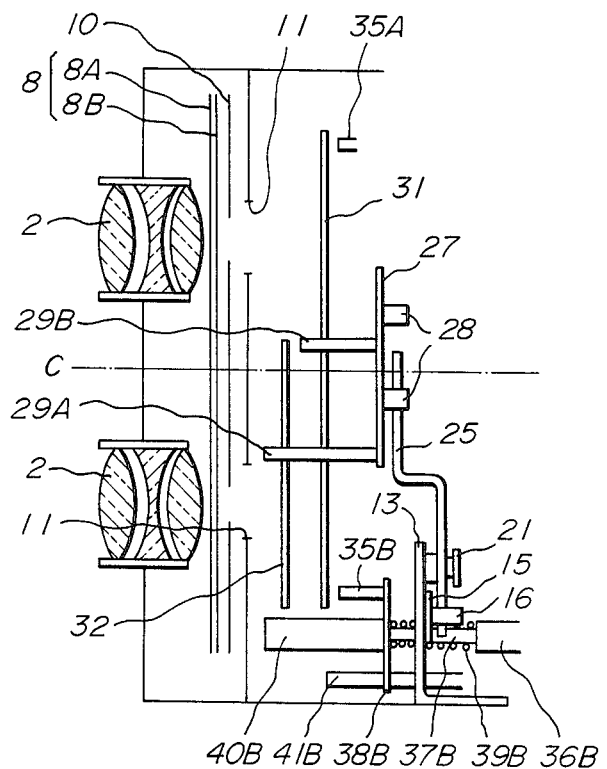
FIG. 5 is a side view schematically showing the principal part shown in FIG. 4.

FIG. 4 illustrates a principal portion of a first embodiment of the invention viewed from a rear side of the camera body 1. FIG. 5 is a side view of the camera illustrating parts between front and back surfaces of the camera with an enlarged distance therebetween.

FIG. 6 illustrates the outline of a shutter 8 provided on the rear sides of photographing lens 2. The shutter 8 consists of an opening blade 8A having four windows 8a corresponding to the respective lenses and a closing blade 8B having four shut-off plates 8b and is rotatable about a center axis C passing through a center of a film (FIG. 2) and perpendicular to a surface of the film.

The opening blade 8A and the closing blade 8B are normally urged in clockwise directions viewed in FIG. 6 by springs 9A and 9B connected between stationary portions and the opening blade 8A and the closing blade 8B in a manner that the windows 8a are closed by the shut-off plates 8b under a shutter released condition. If required, irises 10 are provided behind the shutter 8 and openings are arranged behind the irises corresponding to the respective photographing lenses 2 as shown in FIG. 5.

When the closing blade 8B is therefore rotated against a force of the spring 9B from the shutter released condition shown in FIG. 6 in a counterclockwise direction viewed in FIG. 6, the opening blade 8A is also rotated in the same direction with the aid of a projection 8c and a rod 8d respectively integrally formed with the opening and closing blades 8A and 8B until the opening blade 8A engages an engaging lever 12 so that the spring 9A is maintained in an energy-accumulated or tensioned condition. On the other hand, the closing blade 8B is returned by the spring 9B in the clockwise direction in response to returning of a charge pin 16 as explained later to complete a shutter charge.

At this time, the windows 8a of the opening blade 8A are at locations shifted from the photographing lens openings 11 so that the shutter is kept in the closed position.

Upon release operation in this condition, the engaging lever 12 is rocked in a clockwise direction so as to disengage from the opening blade 8A, so that the opening blade 8A is rotated in the clockwise direction by the action of the spring 9A, with the result that the windows 8a pass through the photographing lens openings 11 to expose surfaces of films. The opening blade 8A is then stopped when the windows 8a are aligned with the shut-off plates 8b of the closing blade 8B to complete the shutter operation. When the closing blade 8B is rotated in the counterclockwise direction for a next shutter charge, the windows 8a of the opening blade 8A pass through the openings 11, while the windows 8a are maintained closed by the shut-off plates 8b.

Referring to FIGS. 4 and 5, the camera body 1 is provided on its bottom with a base plate 13 upstanding and perpendicular to the center axis C. A charge link 15 is slidably provided on the base plate 13 with the aid of a shaft 14, an elongated aperture 15a formed in the charge link 15, the charge pin 16 and elongated aperture 15a formed in the base plate 13. The charge link 15 has at one end a bent portion 15b engaging a cam surface of a cam plate 17. To a rotating shaft of a motor 18 is fixed a pinion 19 which is in mesh with a gear 20 to which is in turn fixed the cam plate 17, so that one rotation of the cam plate 17 by the motor 18 causes one reciprocating movement of the charge link 15.

A connecting lever bent at an obtuse angle or bell crank lever 22 is pivotally connected on a shaft 21 provided on the base plate 13 and is urged in a counterclockwise direction viewed in FIG. 4 by an action of a spring 23 whose ends are adapted to act on the bell crank lever 22 and a stationary portion, respectively. The bell crank lever 22 has a bifurcated end engaging the charge pin 16 planted in the charge link 15. The other end of the bell crank lever 22 is pivotally connected to one end of a feed pawl 25 by a shaft 24. A spring 26 is arranged about the shaft 24 between the feed pawl 25 and the bell crank lever 22 to urge the feed pawl 25 to the left or in a counterclockwise direction viewed in FIG. 4.

A disc-like driving member 27 is arranged rotatably about the center axis C and provided with four connecting pins 28 planted on one surface of the driving member 27 and circumferentially equally spaced apart from each other. The connecting pins 28 are engageable with a pawl portion 25a of the feed pawl 25. The driving member 27 is further provided on the other surface with two positioning pins 29A and 29B planted therein and angularly spaced by 90° in order to prevent the first and second sectors from excessively being driven. In this manner the one reciprocating movement of the connecting link 15 causes one of the connecting pins 28 to be pushed by the pawl portion 25a of the feed pawl 25 so as to drive the driving member 27 in increments of 90° in the clockwise direction. The driving member 27 is formed with four recesses 27a dividing an outer circumference into four equal parts. A leaf spring 30 is fixed to a stationary portion of the camera body. A free end of the leaf spring 30 is bent such that the bent free end is adapted to engage one of the recesses 27a of the driving member 27, with the result that the driving member 27 is click-stopped in predetermined rotated positions.

A first sector 31 and a second sector 32 are provided rotatably about the center axis C as shown in FIG. 7. In this embodiment, the first sector 31 is formed as an H-shaped thin sector which consists of two arcuate flanges and one web and is rotatable about a center of the web. The two arcuate flanges extend substantially along a circle having a center at the center of the web. The second sector 32 is formed as a T-shaped thin sector which consists of one arcuate flange and one web. The sector 32 is rotatable about a center in one end of the web remote from the arcuate flange. The arcuate flange extends substantially along a circle having the rotating center of the sector. Springs 33 and 34 whose spring forces are weaker than the click force of the leaf spring 30 are connected between the first and second sectors 31 and 32 respectively and the driving member 27. Shapes of the first and second sectors 31 and 32 are determined to fulfil the following conditions. In the event that the positioning pins 29A and 29B engage the first and second sectors 31 and 32 as shown in FIG. 7, the first and second sectors 31 and 32 are rotated together with the driving member 27 in unison in increments of 90°. At respective stopped positions, the lens openings 11 are not shut off or not closed by the first and second sectors as shown in FIG. 7. During the rotation, however, two diametrically opposed openings 11 are shut off or closed by the first sector 31, and either one of the remaining openings 11 is shut off or closed by the second sector 32.

Moreover, the first sector 31 is provided with engaging pawls 31a, 31b, 31c and 31d and the second sector 32 is provided with engaging pawls 32a and 32b. Regulating pins 35A and 35B are provided so as to be engageable and disengageable with these engaging pawls 31a–31d, 32a and 32b.

The construction of these portions will be explained in more in detail with reference to FIGS. 7 and 8.

Figure 8:
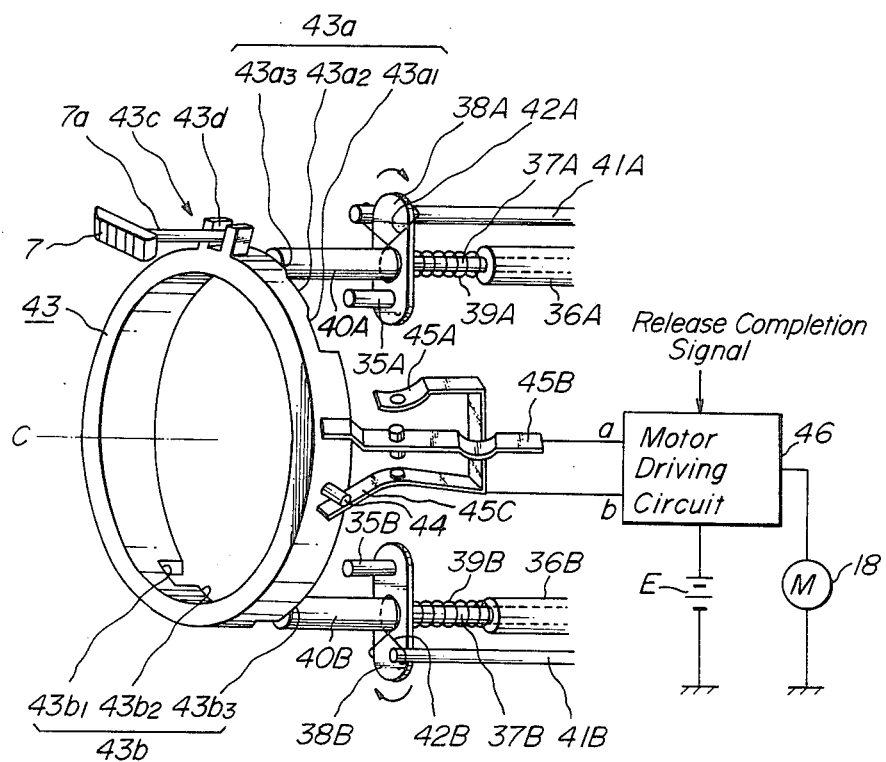
FIG. 8 is a front perspective view illustrating a change-over mechanism of a change-over member of the first embodiment.

As shown in FIG. 8, guide sleeves 36A and 36B are fixed in parallel with the center axis C to the camera body 1, and guide pins 37A and 37B are slidably and rotatably arranged in the guide sleeves 36A and 36B, respectively. Regulating arms 38A and 38B are fixed to front ends of the guide pins 37A and 37B and are provided on one end nearer to the center axis C with the regulating pins 35A and 35B planted therein. Compression springs 39A and 39B are arranged between the regulating arms 38A and 38B and the guide sleeves 36A and 36B to urge the guide pins 37A and 37B into the front direction or to the left as viewed in FIG. 8.

Setting pins 40A and 40B are fixed to the regulating arms 38A and 38B so as to be aligned with the guide pins 37A and 37B. Fixed pins 41A and 41B are provided in parallel with the guide pins 37A and 37B. Springs 42A and 42B stronger than the springs 33 and 34 are engaged about the setting pins 40A and 40B between the regulating arms 38A and 38B and the fixed pins 41A and 41B to urge the regulating arms 38A and 38B into counterclockwise directions as viewed in the drawings, so that the regulating arms 38A and 38B abutting against the fixed pins 41A and 41B are directing upward and downward, respectively.

On the other hand, a change-over member 43 in the form of a ring is provided about the center axis C at the front end of the camera body 1. The change-over member 43 is formed in a rear face with step cams 43$a$ and 43$b$, each comprising a low step 43$a_1$ or 43$b_1$, a medium step 43$a_2$ or 43$b_2$ and a high steps 43$a_3$ or 43$b_3$. Engagement of the setting pins 40A and 40B with the step cams 43$a$ and 43$b$ varies the position of the guide pins 37A and 37B in the directions of the center axis C against the springs 39A and 39B. When the setting pins 40A and 40B engage the low steps 43$a_1$ and 43$b_1$, the regulating pins 35A and 35B are at a first or most advanced position where both the regulating pins 35A and 35B engage the first and second sectors 31 and 32. When the setting pins 40A and 40B engage the medium steps 43$a_2$ and 43$b_2$, the regulating pins 35A and 35B are at a second position where the regulating pins 35A and 35B engage only the first sector 31. Moreover, when the setting pins 40A and 40B engage the high steps 43$a_3$ and 43$b_3$, the regulating pins 35A and 35B are at a third position where the regulating pins 35A and 35B engage neither of the first and second sectors.

Moreover, the change-over member 43 is provided on its side with an insulating pin 44 extending therefrom. Contact pieces 45A, 45B and 45C are provided on a stationary portion of a camera body and connected to a motor driving circuit 46 for driving the motor 18. When the change-over member 43 is changed to cause the setting pins 40A and 40B to engage the high steps 43$a_3$ and 43$b_3$ of the step cams 43$a$ and 43$b$, the contact piece 45C is disengaged from the contact piece 45B by the insulating pin 44 to open terminals a and b in the motor driving circuit 46 as shown in FIG. 9$a$. When the change-over member 43 is changed to permit the setting pins 40A and 40B to engage the medium steps 43$a_2$ and 43$b_2$, the insulating pin 44 is disengaged from the contact piece 45C, and the contact piece 45C contacts the contact piece 45B by a resilient force of the contact piece 45C itself to make conductive the terminals a and b in the motor driving circuit 46 as shown in FIG. 9$b$. Furthermore, upon changing over the change-over member 43 to engage the setting pins 40A and 40B with the low steps 43$a_1$, and 43$b$, the insulating pin 44 brings the contact piece 45B into contact with the contact piece 45A to make conductive the terminals a and b again as shown in FIG. 9$c$.

The motor driving circuit 46 is supplied with power from a power source E and is constructed to achieve the following operation. When the terminals a and b become conductive and a release completion signal is inputted after the shutter 8 has been actuated by pushing the release button 3 in FIG. 3, the motor 18 is energized to cause one rotation of the cam plate 17 in FIG. 4 and under this condition the power to the motor 18 is interrupted.

The change-over member 43 is provided on its top portion with a bifurcate portion 43$c$ forming a clearance 43$d$ into which a pin 7$a$ of the change-over knob 7 (FIG. 3) is inserted. The change-over knob 7 is horizontally slidable in the front surface of the camera body 1.

The operation of the device of the embodiment above constructed is explained.

When the change-over knob 7 is set at the four-picture photographing position, the change-over member 43 is at the counterclockwise most rotated position viewed in the back view of FIG. 7 where the high steps 43$a_3$ and 43$b_3$ engage the setting pins 40A and 40B. Therefore, the guide pins 37A and 37B are at the most retracted position against the compression springs 39A and 39B so that the regulating pins 35A and 35B are at the third position where the regulating pins 35A and 35B engage neither of the first and second sectors 31 and 32 with the result that all the openings 11 are kept opened.

Therefore, the four identical pictures are photographed on one frame of a film by one photographing.

On termination of the shutter operation, a release completion signal is inputted into the motor driving circuit 46 to energize the motor 18, so that the cam plate 17 shown in FIG. 4 performs one rotation and stops. During the rotation of the cam plate 17, the charge link 15 is pushed toward the left viewed in FIG. 4 by the cam plate 17 so that the charge pin 16 causes the opening blade 8A and the closing blade 8B to rotate against the springs 9A and 9B (FIG. 6) until the opening blade 8A engages the engaging lever 12 and the closing blade 8B is still in the energy accumulating condition to accomplish the shutter charge.

At the same time, the charge pin 16 substantially upwardly drives the feed pawl 25 through the connecting lever or bell crank lever 22 so that the pawl portion 25$a$ of the feed pawl 25 upwardly pushes one of the connecting pins 28 as shown in phantom lines in FIG. 4. As a result, the driving member 27 rotates through 90° in the clockwise direction against the click force of the leaf spring 30 so that the first and second sectors 31 and 32 are rotated by the springs 33 and 34 following to the driving member 27 in unison.

When the driving member 27 has been rotated through 90°, the bent free end of the leaf spring 30 engages the next recess 27$a$ to click-stop the driving member 27 thereat.

Thereafter, when the charge link 15 again engages the lowermost step of the cam plate 17 as shown in FIG. 4, the connecting lever or bell crank lever 22 is rotated by the action of the spring 23 so that the feed pawl 25 is returned from the position shown in phantom lines to the position shown in solid lines in FIG. 4 and the charge link 15 is moved to the right into the position shown in the drawing. The closing blade 8B of the shutter 8 is also returned.

FIGS. 10$a$, 10$b$, 10$c$ and 10$d$ illustrate respectively different rotated conditions of the driving member 27 and the first and second sectors 31 and 32 rotated following to the driving member 27 through the springs 33 and 34, when the change-over member 43 is set at the four-picture photographing position. By releasing the shutter four times, these members once pass through these respective conditions shown in Figs. 10$a$–10$d$.

In this case, as the regulating pins 35A and 35B are always at the third position where they engage neither of the first and second sectors 31 and 32, the first and second sectors 31 and 32 are also rotated in unison, when the driving member 27 is rotated in increments of 90° in response to the shutter charges. Accordingly, the four photographing lens openings 11 are kept opened in any conditions, so that the four identical pictures are photographed on one frame of the film.

When the change-over knob 7 shown in FIG. 8 is set from this position into a two picture photographing position, the change-over member 43 is rotated in the counterclockwise direction viewed in this drawing so that the setting pins 40A and 40B engage the medium steps $43a_2$ and $43b_2$ of the step cams 43a and 43b, with the result that the guide pins 37A and 37B are advanced one step by forces of the compression springs 39A and 39B, and the regulating pins 35A and 35B are at the second position where the regulating pins 35A and 35B engage only the first sector 31.

At the same time, the contact piece 45C is released from the restriction of the insulating pin 44, so that the contact piece 45C contacts the contact piece 45B by the resilient force of the contact piece 45C as shown in FIG. 9b. Under such a condition, the motor 18 is rotated with the aid of the driving circuit 46 so that the cam plate 17 shown in FIG. 4 is rotated one revolution and the charge link 15 performs one reciprocating movement, with the result that the feed pawl 25 urges the connecting pin 28 to rotate the driving member 27 through 90°.

At this time, the shutter 8 has been charged after the termination of the previous shutter operation. Therefore, the charge pin 16 causes only the driving member 27 to rotate.

The rotation of the driving member 27 causes the first and second sectors 31 and 32 to rotate, during which rotation the first sector 31 is prevented from rotating because of the regulating pins 35A and 35B engaging the engaging pawls 31a and 31b of the first sector 31, so that the first sector 31 is stopped, while the spring 33 is elongated. The second sector 32 which does not engage the regulating pins 35A and 35B is rotated together with the driving member 27. Therefore, the two photographing lens openings 11 diametrically opposed on both sides of the center axis C are shut off by the first sector.

Figure 11B:
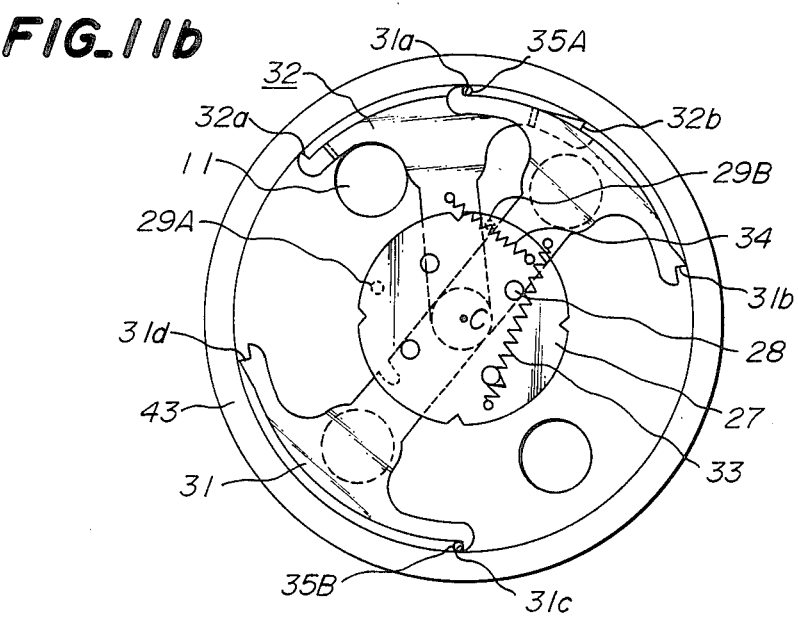

FIGS. 11a, 11b, 11c and 11d illustrate different rotated conditions of the respective sectors in case of two-picture photographing. FIG. 11a shows the condition immediately after changing the four-picture to two-picture photographing. FIG. 11b illustrates the condition that the driving member 27 has rotated through 90° from the condition shown in FIG. 11a.

After one photographing is finished starting from the condition shown in FIG. 11b, the driving member 27 is further rotated through 90°. During this rotation, the positioning pin 29B drives the first sector 31 in the clockwise direction so that the engaging pawls 31a and 31c urge the regulating pins 35A and 35B in the clockwise direction, with the result that the regulating arms 38A and 38B are rotated in the clockwise direction as viewed in FIG. 8 (counterclockwise direction in FIG. 11b) against the force of the springs 42A and 42B to move the regulating pins 35A and 35B away from the rotating range of the first sector 31.

As a result, the first sector 31 further rotates in the clockwise direction. Without any interference of the engaging pawls 31a and 31c, the regulating arms 38A and 38B immediately rotate in the counterclockwise direction by the force of the springs 42A and 42B until the regulating arms 38A and 38B abut against the fixed pins 41A and 41B. Then the regulating pins 35A and 35B again enter within the rotating zone of the first sector 31 to engage and stop the engaging pawls 31a and 31b of the first sector so that the two openings 11 which have finished photographing are closed and the two remaining openings 11 which have not exposed are opened.

Figure 11C:
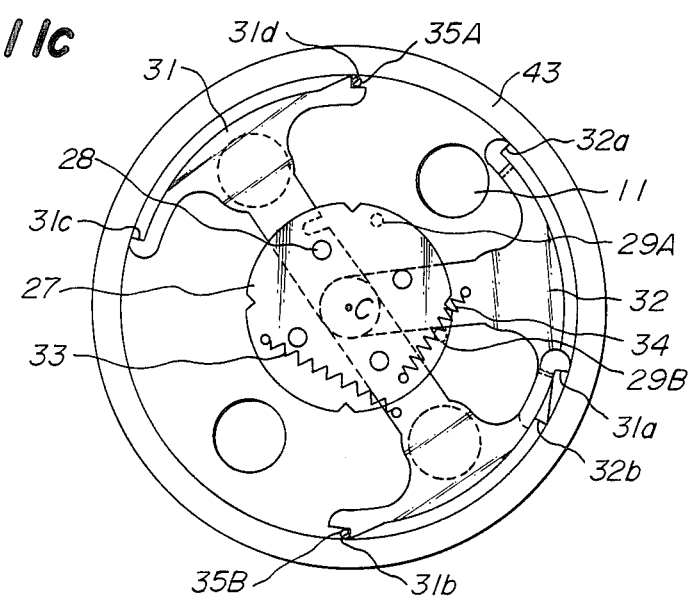

The driving member 27 is then rotated to rotate the second sector 32 due to the traction of the spring 34 together with the first sector 31 so that the first and second sectors 31 and 32 are moved from the condition shown in FIG. 11b and stopped at the condition shown in FIG. 11c.

When the driving member 27 is rotated through 90° starting from the condition shown in FIG. 11c, the springs 33 and 34 are elongated because the engaging pawls 31d and 31b engage the regulating pins 35A and 35B. However, when the positioning pin 29B abuts against the first sector 31, the regulating pins 35A and 35B are disengaged from the engaging pawls 31d and 31b. Thereafter, the engaging pawls 31c and 31a are engaged with and stopped by the returned regulating pins 35A and 35B, respectively, as shown in FIG. 11d.

The condition in FIG. 11d is the same as that of the first and second sectors 31 and 32 shown in FIG. 11b but rotated through 180°. The two photographing is accomplished by the rotation of the driving member 27 in increments of 90° in this manner.

Moreover, when the change-over knob 7 is set at the one-picture photographing position, the change-over member 43 is further rotated in the counterclockwise direction viewed in FIG. 8 so that the setting pins 40A and 40B engage the low steps $43a_1$ and $43b_1$ of the step cams 43a and 43b. Accordingly, the regulating pins 35A and 35B are at the first position where both the regulating pins 35A and 35B engage the first and second sectors 31 and 32.

At the same time, the insulating pin 44 brings the contact piece 45B into contact with the contact piece 45A as shown in FIG. 9c. In this case, therefore, the driving circuit 46 energizes the motor 18 to cause the driving member 27 to rotate through 90°.

FIGS. 12a, 12b, 12c, 12d and 12e illustrate different rotated conditions of the first and second sectors in the one-picture photographing. FIG. 12a illustrates the condition immediately after the changing over to the one-picture photographing. FIG. 12b shows the condition that the driving member 27 has been rotated through 90° starting from the condition shown in FIG. 12a.

In more detail, when the driving member 27 is rotated from the condition shown in FIG. 12a through 90°, the first and second sectors 31 and 32 are rotated by the traction of the springs 33 and 34. During such a rotation, the regulating pins 35A and 35B engage the engaging pawls 31a and 31c of the first sector 31 to stop the rotation of the first sector 31, while the regulating pin 35A engages the engaging pawl 32b of the second sector 32 to stop the rotation of the second sector 32 as shown in FIG. 12b. In this condition, the three photographing openings 11 are shut off and the remaining one opening is opened so that only one picture is photographed in one photographing.

When the driving member 27 is then rotated in the clockwise direction through 90° starting from the condition shown in FIG. 12b, the positioning pin 29B drives the first sector 31 in the clockwise direction. The regulating pins 35A and 35B are once retracted and thereafter returned in the same manner in the two-picture photographing. The second sector 32 is also rotated in the same direction through the spring 34 by the rotation of the driving member 27. In this manner, when the regulating pin 35A engages and stops the engaging pawls 31d and 32a, and the regulating pin 35B engages and stops the engaging pawl 31b, the first and second sectors 31 and 32 are stopped as shown in FIG. 12c.

Furthermore, when the driving member 27 is rotated through 90° starting from the condition shown in FIG. 12c, the second sector 32 is driven by the positioning pin 29A to cause the regulating pin 35A to retract. As the first sector 31 is not in contact with positioning pin 29B, the first sector 31 is maintained engaging with and stopped by the regulating pin 35B. However, the spring 33 is elongated by the rotation of the driving member 27 and the positioning pin 29B abuts against the first sector 31 so that the regulating pin 35B is also retracted from the first sector 31, with the result that the first and second sectors 31 and 32 are rotated together. Thereafter, the engaging pawl 31c engages the regulating pin 35A, and the engaging pawls 31a and 32b engage the regulating pin 35B so that the first and second sectors 31 and 32 are stopped. Only the other one opening is opened shown in FIG. 12d.

In case that the driving member 27 is further rotated through 90° starting from the condition shown in FIG. 12d, the first and second sectors 31 and 32 are rotated and positioned in the same manner as above described, so that the remaining one opening is opened in the condition shown in FIG. 12e. The one-picture photographing of four times is completed.

The changing over from the four-picture to two-picture photographing and the four-picture to one-picture photographing has been explained in the above explanation. In case of changing over from the one-picture to two-picture or four-picture photographing, the regulating pins 35A and 35B engaging and restraining the first sector 31 or both the first and second sectors 31 and 32 are retracted from their engaging positions. At the moment of changing over, therefore, the first sector 31 or both the first and second sectors 31 and 32 are released from the restraint of the regulating pins and rotated through the force of the springs 33 and 34 by the driving member 27 into predetermined or desired conditions.

All the conditions immediately after changing over are the same which is clear in comparison with FIGS. 10a, 11a and 12a. The operation starting from these conditions has been explained hereinafter. It is not necessarily required to do so. The changing over may be effected starting from any conditions as shown in FIGS. 10b-10d, 11b-11d and 12b-12e.

In this embodiment, the regulating pins 35A and 35B are retracted by the force of the positioning pins 29B and 29A for driving the first and second sectors 31 and 32. In the event that the positioning pins 29B and 29A are not in contact with the first and second sectors 31 and 32, the regulating pins 35A and 35B are retracted after the driving member 27 has rotated through a certain angle. As a result, the returning of the regulating pins 35A and 35B may delay, and therefore there is a risk incapable of stopping the first and second sectors at the predetermined positions.

Figure 13:
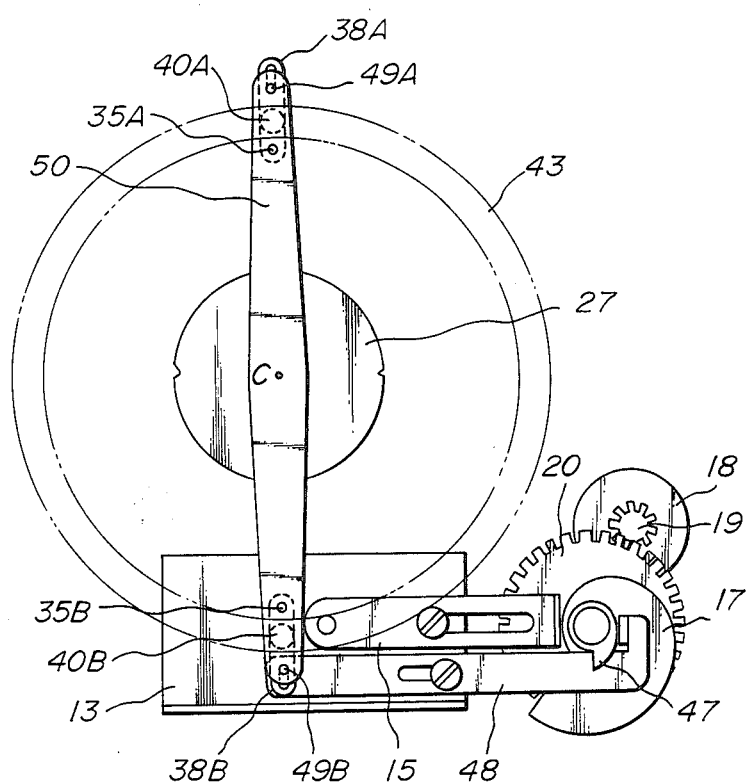
FIG. 13 is a backside view showing a principal part of a second embodiment according to the invention.

FIG. 13 illustrates a second embodiment of the invention solving this problem. In this embodiment, a cam plate 47 is arranged concentrically to the cam plate 17 and is provided with a slide plate 48 slidable in parallel with the charge link 15 but in opposite directions to the sliding directions of the charge link 15. The slide plate 48 is provided with a pin 49B planted therein. A lever 50 is provided rotatably about the center axis of the film and has a lower end pivotally connected to the pin 49B. The lever 50 is provided with a pin 49A planted therein on a symmetrically opposite side to the pin 49B with respect to the center axis C. The pins 49A and 49B are used instead of the fixed pins 41A and 41B shown in FIG. 8. Other constructions are substantially the same as those of the first embodiment.

In this second embodiment, the pins 49A and 49B cause the regulating arms 38A and 38B to rotate in the clockwise direction viewed in FIG. 8 (counterclockwise direction in FIG. 13 of a backside view) in an initial period of the shutter charge or in an initial period of the rotation of the driving member 27, so that the regulating pins 35A and 35B are retracted from the passages of the first and second sectors 31 and 32 and thereafter returned into the passages. Therefore, the malfunction in restraining the sectors due to the delay of returning of the positioning pins is prevented, and an excessive force acting upon the positioning pins 29A and 29B to damage them is avoided.

In this embodiment, moreover, utilizing the movement of the slide plate 48 in the initial period of the shutter charge, the guide pins 37A and 37B are driven rearwardly against the force of the springs 39A and 39B with the aid of means such as tapered surfaces, whereby enabling the regulating pins 35A and 35B to retract from the first and second sectors 31 and 32. In this case, the regulating arms 38A and 38B need not be rotated. The fixed pins 41A and 41B and the springs 42A and 42B are not necessary. It is sufficient to move the regulating pins 35A and 35B through very small distances back and forth.

Although the driving member 27 is rotated in increments of 90° by all means by the feed pawl 25 in response to the shutter charge even in the four-picture photographing in the first embodiment, such an operation is not necessarily essential in this case.

Figure 14:
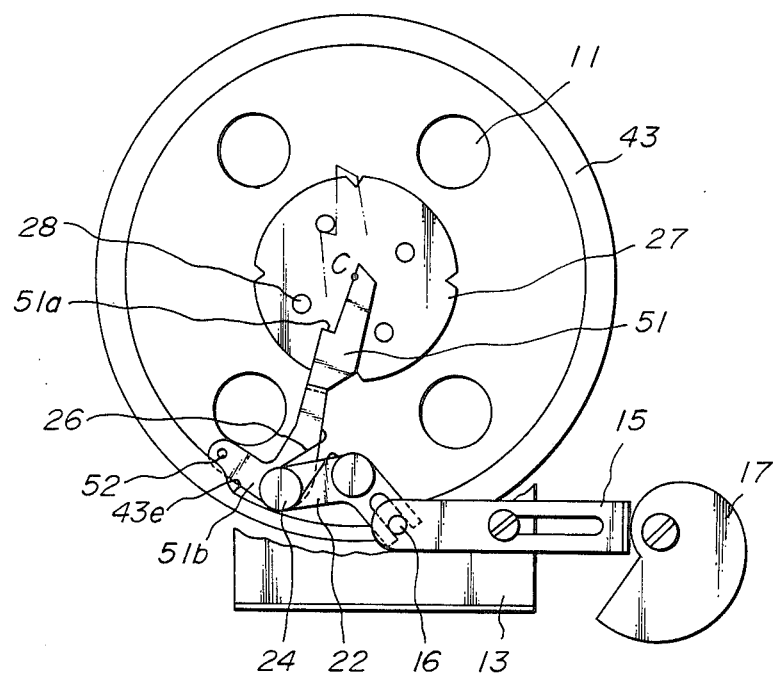
FIG. 14 is a backside view illustrating a principal part of a third embodiment according to the invention.

FIG. 14 illustrates a third embodiment of the invention improved in consideration of this rotation of the driving member 27. Different from the feed pawl 25 shown in FIG. 4, a feed pawl 51 is integrally formed with a tail portion 51b which extends from its end pivotally connected to the bell crank lever 22 substantially perpendicular to the feed pawl 51. The tail portion is provided with a connecting pin 52 planted therein in parallel with the center axis C of the film. A changeover member 43 is formed in its inner surface with a cam surface 43e. A relation between the cam surface 43e and the other parts is selected such that the connecting pin 52 engages the cam surface 43e and the feed pawl 51 is slightly rotated in a clockwise direction, when the change-over member 43 has been rotated in a counterclockwise direction viewed in FIG. 14 to set it at the four-picture photographing position and the charge link is at an extreme position at the right hand in FIG. 14. The other construction of this embodiment is substantially similar to that of the first embodiment.

When the cam plate 17 is rotated one revolution in a counterclockwise direction from the position shown in FIG. 14, the feed pawl 51 is urged upward through a connecting lever or bell crank lever 22 by a charge pin 16. However, as the feed pawl 51 is at a rotated position in the clockwise direction, the pawl portion 51a does not engage a connecting pin 28 and passes by it. Thereafter, the connecting pin 52 disengages from the cam surface 43e and is rotated in the counterclockwise direction by the action of a spring 26, so that the feed pawl 51 engages a preceding connecting pin 28 and slides thereon. Then the feed pawl 51 is returned into the position shown in FIG. 14. The driving member 27 and the first and second sectors 31 and 32 driven thereby are thus maintained in inoperative positions.

In the above embodiments, the invention has been explained with reference to the application to the four lens camera capable of charging the shutter by the electric motor. In contrast herewith, FIG. 15 illustrates a fourth embodiment of the invention applied to a four lens camera manually charging its shutter.

In charging the shutter by the electric motor, the shutter and the driving member can be operated only by actuating the motor driving circuit upon releasing the shutter or changing over the change-over member. In manually charging the shutter, on the other hand, even if the manual rotation of the driving member 27 through 90° is missed in changing over the change-over member, the shutter is released by releasing operation, so long as the shutter has been charged, so that photographing is effected under a condition before or in the middle of changing over.

Figure 15:
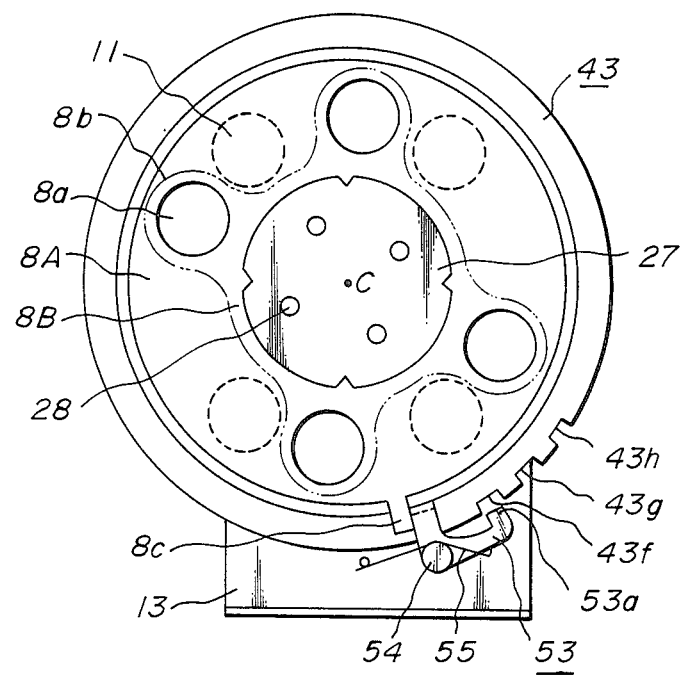
FIG. 15 is a backside view illustrating a principal part of a fourth embodiment according to the invention.

FIG. 15 illustrates one embodiment for solving this problem. An engaging lever 53 is pivotally mounted on a base plate 13 at a shaft 54 and has one end adapted to engage the projection 8c of the opening blade 8A of the shutter 8 shown in FIG. 6. A spring 55 is arranged to act between the engaging lever 53 and the base plate 13 so as to urge the engaging lever 53 in a counterclockwise direction shown in FIG. 15.

A change-over member 43 is formed in its outer circumference with three notched grooves 43f, 43g and 43h. When the change-over member 43 is set at the one-picture, two-picture or four picture photographing position, an engaging pawl 53a of the engaging lever 53 is in opposition to the notched groove 43f, 43g or 43h. Under a shutter released condition, the engaging lever 53 is rotated in a clockwise direction by the projection 8c of the opening blade 8A of the shutter 8 against the force of the spring 55, so that the engaging pawl 53a disengages from the noticed groove 43f, 43g or 43h to permit the change-over member 43 to rotate. On the other hand, under the shutter charged condition wherein the opening blade 8A has been rotated in the clockwise direction viewed in FIG. 15, the engaging lever 53 disengaged from the projection 8c has been rotated in the counterclockwise direction by the spring 55 so that the engaging pawl 53a engages the notched groove 43h (one-picture photographing), 43g (two-picture photographing) or 43f (four-picture photographing) to prevent the change-over member 43 from rotating. In this case, the other construction is also similar to that of the first embodiment.

With this arrangement, the change-over member 43 is freely rotated under the condition that the shutter has not been charged yet after photographing. The change-over member 43 is rotated and the shutter is charged to bring the camera into the condition ready for photographing.

Even if the release button is pressed without charging the shutter, any photographing is not effected because the shutter is inoperative. By charging the shutter the driving member 27 is rotated through 90° to effect the changing of photographing number.

Moreover, under the condition that the shutter has been charged, the photographing number could not be changed because the change-over member 43 could not be rotated. In this case, after the release button is pushed without photographing to bring the shutter into the released condition, the photographing number may be changed.

Moreover, the change-over knob 7 should be so constructed as not to be unintentionally moved upon inadvertent contacting the knob 7. For example, there is provided a clamp mechanism which is released by moving the knob 7 in a direction perpendicular to the moving direction of the knob 7 before it is changed over. If it is so constructed that contacts of an electromagnetic release are closed by the perpendicular movement of the change-over knob 7, the shutter is released immediately before the changing of the changing-over member even after the shutter charge, so that the change-over member can be changed.

Instead of that the rotation of the change-over member is prevented or allowed depending upon whether the shutter has been charged or not, moreover, the driving member may be rotated through 90° with the aid of the rotating force of the change-over member.

The configurations of the first and second sectors 31 and 32 are not limited to those shown in the drawings. Any configurations may be acceptable so long as the first and second sectors can shut off the light under the regulated condition by the regulating pins 35A and 35B.

As can be seen from the above explanation, the photographing number change-over device for a four lens camera according to the invention comprises the driving member rotated in increments of 90° geared with the shutter charge and the first and second sectors rotated by the springs following to the driving member so that these first and second sectors are normally stopped at positions where they do not shut off the photographing lenses. Moreover, when the regulating members engage and stop the sectors which are selected by the change-over member, the first and second sectors shut off the two or three photographing lenses. Accordingly, required picture number photographing is always effected even if the photographing number is changed under any conditions. With this arrangement, easiness in operation of the device according to the invention is greatly improved in comparison with the prior art using lens caps, and photographing errors such as multiple exposure, shutter operation without proper photographing and the like are previously prevented.

It is further understood by those skilled in the art that the foregoing description is that of preferred embodiments of the disclosed devices and that various changes and modifications may be made in the invention without departing from the spirit and scope thereof.

What is claimed is:

1. A photographing number change-over device for a four lens camera having four photographing lenses and capable of simultaneously photographing four pictures on a film, said device comprising first light shutting-off means for shutting off two photographing lenses symmetrically opposed with respect to a center axis substantially perpendicular to the film and passing through a substantial center of the film, second light shutting-off means for shutting off either one of two remaining photographing lenses, driving means rotatable about said center axis in increments of 90° for driving through resilient means said first and second light shutting-off means to positions where all the photographing lenses are not shut off, regulating means engageable and stopping said first and second light shutting-off means against forces of said resilient means at positions where the photographing lenses are shut off, and change-over means for changing over said regulating means to a first position where engaging and stopping both said first and second light shutting-off means, a second position where engaging and stopping only said first light shutting-off means, and a third position where engaging and stopping neither the first nor the second light shutting-off means.

2. A photographing number change-over device as set forth in claim 1, wherein said first light shutting-off means comprises an H-shaped thin sector consisting of two arcuate flanges and one web, the sector rotatable about a center of said web and said two arcuate flanges extending substantially along a circle having a center at the center of said web and having at ends engaging pawls engaging said regulating means, and wherein said second light shutting-off means comprises a T-shaped thin sector consisting of one arcuate flange and one web, the sector rotatable about a center in one end of the web remote from the arcuate flange and said arcuate flange extending substantially along a circle having the rotating center of the sector and having at ends engaging pawls engaging said regulating means.

3. A photographing number change-over device as set forth in claim 1, wherein said driving means comprises a disk-like driving member, reciprocal moving means, link and pawl means for rotatively driving said driving member in increments of 90° in synchronism with reciprocal movements of an output end of said reciprocal moving means.

4. A photographing number change-over device as set forth in claim 3, wherein said reciprocal moving means comprises an electric motor, reduction gear means, a reciprocal moving member, cam means for causing a reciprocal movement of said reciprocal moving member upon one rotation of the cam means and a charge pin provided on one end of the reciprocal moving member, and said link and pawl means comprises a bell crank lever having a bifurcated end engaging said charge pin, a feed pawl having one end pivotally connected to another end of said bell crank lever, and four pins planted in one surface of said driving member and driven by a pawl portion of said pawl at the other end thereof.

5. A photographing number change-over device as set forth in claim 3, wherein said disc-like driving member is provided with two positioning pins engageable with said first and second light shutting off means to prevent them driven by said resilient means from excessively being driven.

6. A photographing number change-over device as set forth in claim 1, wherein said change-over means comprises an annular change-over member rotatively driven by a change-over knob, said change-over member comprises two sets of step cams, each step cam consisting of a low step, a medium step and a high step for determining positions of said regulating means and an insulating pin for controlling said driving means.

7. A photographing number change-over device as set forth in claim 6, wherein said regulating means comprises regulating pins, each regulating pin carried by a regulating arm normally urged to one of said step cams and capable of moving into and away from passages of said first and second light shutting-off means.

8. A photographing number change-over device as set forth in claim 7, wherein said regulating arm is connected to a guide pin slidable and rotatable in a guide sleeve fixed to a stationary portion of said camera so that a setting pin which is in parallel with said regulating pin and fixed to said regulating arm is always urged against said step cam by a spring located between said regulating arm and said guide sleeve, and said regulating arm is urged by a spring against a fixed pin.

9. A photographing number change-over device as set forth in claim 3, wherein said reciprocal moving means comprises an electric motor, reduction gear means, a reciprocal moving member, cam means for causing a reciprocal movement of said reciprocal moving member upon one rotation of the cam means and a charge pin provided on one end of the reciprocal moving member, and further comprises a slide plate slidable in parallel with the reciprocal movement of said reciprocal moving member, and further cam means provided concentrically to said first mentioned cam means for causing a reciprocal movement of said slide plate in opposite directions to those of said reciprocal movement of said reciprocal moving member and wherein there is provided a lever rotatable about its center aligned with the center axis of the film, said lever having one end pivotally connected to a pin provided on said slide plate and the other end provided with a pin on a symmetrically opposite side to the pin provided on said slide plate with respect to the center axis, thereby retracting said regulating means from passages of said first and second light shutting-off means with the aid of said first and second mentioned pins in an initial period of shutter charge and again returning said regulating means into said passages.

10. A photographing number change-over device as set forth in claim 4, wherein said feed pawl is provided with a tail portion extending from the pivotally connected end in a direction substantially perpendicular to the feed pawl, and wherein said change-over means comprises an annular change-over member, and said change-over member comprises a cam surface formed in an inner surface thereof so that a connecting pin of said tail portion engages said cam surface, whereby said feed pawl does not drive said disc-like driving member when the change-over means has changed over said regulating means to said third position.

11. A photographing number change-over device as set forth in claim 1, wherein said change-over means comprises an annular change-over member rotatively driven by a change-over knob, said change-over member is formed in its outer circumference with three notched grooves and there is provided an engaging lever pivotally mounted on a stationary portion and having one end in opposition to said three notched grooves when the change-over means has changed over said regulating means at the first, second and third positions, respectively, thereby causing said one end of the engaging lever to engage in any one of said notched grooves to prevent a rotation of the change-over member when a shutter has been charged, and causing said one end of the engaging lever to disengage from the notched groove to allow the change-over member to rotate when the shutter has been released.

* * * * *

UNITED STATES PATENT AND TRADEMARK OFFICE
CERTIFICATE OF CORRECTION

PATENT NO. : 4,751,537
DATED : June 14, 1988
INVENTOR(S) : Kazuo Saita

It is certified that error appears in the above-identified patent and that said Letters Patent is hereby corrected as shown below:

Column 4, line 6, change "on" to --by--.

Column 7, line 22, change "steps" to --step--;

line 59, change "43b" to --$43b_1$--.

Column 13, line 48, change "noticed" to --notched--.

Column 14, bridging lines 12 and 13, change "inadvertent" to --inadvertently--.

Signed and Sealed this

Twenty-seventh Day of December, 1988

Attest:

DONALD J. QUIGG

*Attesting Officer*     *Commissioner of Patents and Trademarks*